US012005881B2

(12) United States Patent
Miller et al.

(10) Patent No.: US 12,005,881 B2
(45) Date of Patent: Jun. 11, 2024

(54) METHOD FOR FUNCTIONAL TESTING OF A PRESSURE GENERATOR ASSEMBLY OF AN ELECTRONICALLY SLIP-CONTROLLABLE EXTERNAL POWER BRAKING SYSTEM HAVING REDUNDANT BRAKE PRESSURE GENERATION, IN PARTICULAR FOR AN AUTONOMOUSLY DRIVABLE MOTOR VEHICLE

(71) Applicant: Robert Bosch GmbH, Stuttgart (DE)

(72) Inventors: Jack Miller, Canton, MI (US); Thorsten Maucher, Heidelberg (DE); Viswesvaran Jagadeesan, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 17/626,387

(22) PCT Filed: May 29, 2020

(86) PCT No.: PCT/EP2020/064980
§ 371 (c)(1),
(2) Date: Jan. 11, 2022

(87) PCT Pub. No.: WO2021/023411
PCT Pub. Date: Feb. 11, 2021

(65) Prior Publication Data
US 2022/0250596 A1 Aug. 11, 2022

(30) Foreign Application Priority Data
Aug. 8, 2019 (DE) ............... 10 2019 211 918.2

(51) Int. Cl.
*B60T 8/94* (2006.01)
*B60T 8/176* (2006.01)
(Continued)

(52) U.S. Cl.
CPC ............... *B60T 8/94* (2013.01); *B60T 8/176* (2013.01); *B60T 8/885* (2013.01); *B60T 17/221* (2013.01);
(Continued)

(58) Field of Classification Search
None
See application file for complete search history.

(56) References Cited

U.S. PATENT DOCUMENTS 5,150,951 A * 9/1992 Leiber ............... B60T 8/94
303/119.1
6,513,885 B1 2/2003 Salamat et al.
(Continued)

FOREIGN PATENT DOCUMENTS

CN 1304768 C 3/2007
CN 105764759 A 7/2016
(Continued)

OTHER PUBLICATIONS

International Search Report for PCT/EP2020/064980, Issued Jul. 21, 2020.

*Primary Examiner* — Daniel L Greene
(74) *Attorney, Agent, or Firm* — NORTON ROSE FULBRIGHT US LLP; Gerard A. Messina

(57) ABSTRACT

A method for the functional testing of a pressure generator assembly in an electronically slip-controllable power braking system having redundant brake pressure generation for an autonomously drivable motor vehicle. The method relates to carry out a regular test of the functional capacity of a secondary pressure generator assembly. A primary pressure generator assembly and the secondary pressure generator assembly are hydraulically connected, parallel to one another, to a brake circuit to which a wheel brake is connected. During the method, the wheel brake is decoupled from the brake circuit. At least one pressure generator of the primary pressure generator assembly, or a pressure generator of the secondary pressure generator assembly, is actuated in order to apply pressure to the brake circuit.

12 Claims, 4 Drawing Sheets

(51) Int. Cl.
    *B60T 8/88*      (2006.01)
    *B60T 17/22*    (2006.01)

(52) U.S. Cl.
    CPC ..... *B60T 2270/413* (2013.01); *B60T 2270/88* (2013.01)

(56) References Cited

U.S. PATENT DOCUMENTS

| | | | |
|---|---|---|---|
| 11,046,330 B1* | 6/2021 | Katzourakis | B60W 10/20 |
| 2015/0175146 A1* | 6/2015 | Quirant | B60T 7/042 |
| | | | 303/14 |
| 2016/0009267 A1 | 1/2016 | Lesinski, Jr. | |
| 2016/0304074 A1* | 10/2016 | Maucher | B60T 17/18 |
| 2018/0148023 A1 | 5/2018 | Mannherz et al. | |
| 2021/0394721 A1* | 12/2021 | Hecker | B60T 7/042 |
| 2022/0250600 A1* | 8/2022 | Leiber | B60T 13/686 |

FOREIGN PATENT DOCUMENTS

| | | |
|---|---|---|
| CN | 109476295 A | 3/2019 |
| DE | 4132767 A1 | 4/1993 |
| DE | 4340467 A1 | 6/1995 |
| DE | 102013227065 A1 | 6/2015 |
| DE | 102015206572 A1 | 11/2015 |
| EP | 2108556 A2 | 10/2009 |

* cited by examiner

METHOD FOR FUNCTIONAL TESTING OF A PRESSURE GENERATOR ASSEMBLY OF AN ELECTRONICALLY SLIP-CONTROLLABLE EXTERNAL POWER BRAKING SYSTEM HAVING REDUNDANT BRAKE PRESSURE GENERATION, IN PARTICULAR FOR AN AUTONOMOUSLY DRIVABLE MOTOR VEHICLE

CROSS-REFERENCE TO RELATED APPLICATIONS

The present application is the national stage of International Pat. App. No. PCT/EP2020/064980 filed May 29, 2020, and claims priority under 35 U.S.C. § 119 to DE 10 2019 211 918.2, filed in the Federal Republic of Germany on Aug. 8, 2019.

FIELD

The present invention relates to a method for the functional testing of a pressure generator assembly of an electronically slip-controllable external power braking system having redundant brake pressure generation, in particular for an autonomously drivable motor vehicle.

BACKGROUND INFORMATION

Electronically slip-controllable power brake systems having non-redundant brake pressure generation are described, for example, in German Patent Application No. DE 10 2013 227 065 A1.

In their design, such power brake systems differ from muscular force brake systems in that, during a braking process under normal operating conditions, the brake pressure is provided not by the muscular force of the driver, but rather by a pressure generator driven by an external force. For this purpose, a power brake system has an electronic control device that acquires a desired braking by the driver and, using stored characteristic curves that indicate for example a brake pressure as a function of the actuation path of a braking desire acquisition device, ascertains a target value for a brake pressure that is to be set and sets this brake pressure through corresponding electrical controlling of the drive of a pressure generator.

In brake systems actuated by muscular force, mechanical errors in the pressure generating assemblies can be haptically perceived by the driver through feedback to the actuating unit of the brake system, i.e., at the brake pedal or brake lever. This is not possible in power brake systems, because in these systems, under normal braking conditions, the driver and the brake circuits are hydraulically decoupled from one another.

Motor vehicles that drive in highly automated fashion are also equipped with power brake systems. In this case, however, for safety reasons two pressure generating assemblies are coupled, parallel to one another, to the brake circuits, so that, in the case of a possible fault in one of the pressure generator assemblies, the vehicle can still be safely braked to a standstill using the respective other pressure generator assembly. In this connection one often also speaks of redundant brake pressure generation.

The brake generator assemblies used here are usually units spatially separated from one another, each having separate electronic control devices and energy supplies. To distinguish them more simply, the pressure generator assemblies are therefore also designated primary and secondary pressure generator assemblies.

In conventional realizations, in the normal braking operating state of the power brake system, either both pressure generator assemblies can be involved together in the brake pressure buildup, or the secondary pressure generator assembly is inactive and takes over the brake pressure buildup only after a fault has been determined in the primary brake generator assembly. The present invention, explained in the following, is based on such a design.

The power brake system described in the reference cited above has a primary pressure generator assembly having an electronically controllable plunger unit as first pressure generator, and a secondary pressure generator assembly having a plurality of piston pumps as second pressure generator. However, the invention explained in the following is not limited to these designs and combination of pressure generators.

Because, as explained, secondary pressure generator assemblies are activated only in case of fault of the primary pressure generator assembly, their functional capability has to be tested at regular intervals in order to ensure that they are ready for use when needed.

SUMMARY

An example embodiment of the present invention offers the possibility of testing the functional capability of a pressure generator assembly without action on the part of the driver. The testing can thus be carried out in automated fashion, such that for example specified testing intervals, prevailing environmental conditions, or complexes of loads successfully handled previously by the power brake system, can be taken into account as events triggering the carrying out of such a test. The method can be carried out using the pressure element-controlling components of the brake system that are already present, and does not require any additional mechanical components. In the methods in accordance with example embodiments of the present invention, at least one of the pressure generators is actuated and the valves of the brake system are controlled in such a way that both pressure generator assemblies are hydraulically contacted, parallel to one another, to at least one of the brake circuits, but not to a wheel brake of this brake circuit. On the basis of sensors that are provided, the occurrent pressures and/or paths of the actuation device of the brake system are measured and are evaluated, or plausibilized, by the electronic control device. In the case of faults, a warning signal, or a request to initiate a test of the power brake system in a repair shop, is issued to the driver. In this way, even in case of fault the operational safety of the power brake system can be ensured.

The example methods are not based on any variables representing the driving dynamics of the vehicle, and can thus also be carried out in principle when the vehicle is at a standstill, for example if the driver is not present, or before, or along with, a starting up of the vehicle engine.

Further advantages or advantageous developments of the present invention result from the the following description.

BRIEF DESCRIPTION OF THE DRAWINGS

In the following description, exemplary embodiments of the present invention are explained in detail on the basis of the figures.

In the Figures, the corresponding components of the power brake system have been provided with the same reference characters throughout. In the Figures, these components assume different actuation settings.

DETAILED DESCRIPTION OF EXAMPLE EMBODIMENTS

Figure 1:
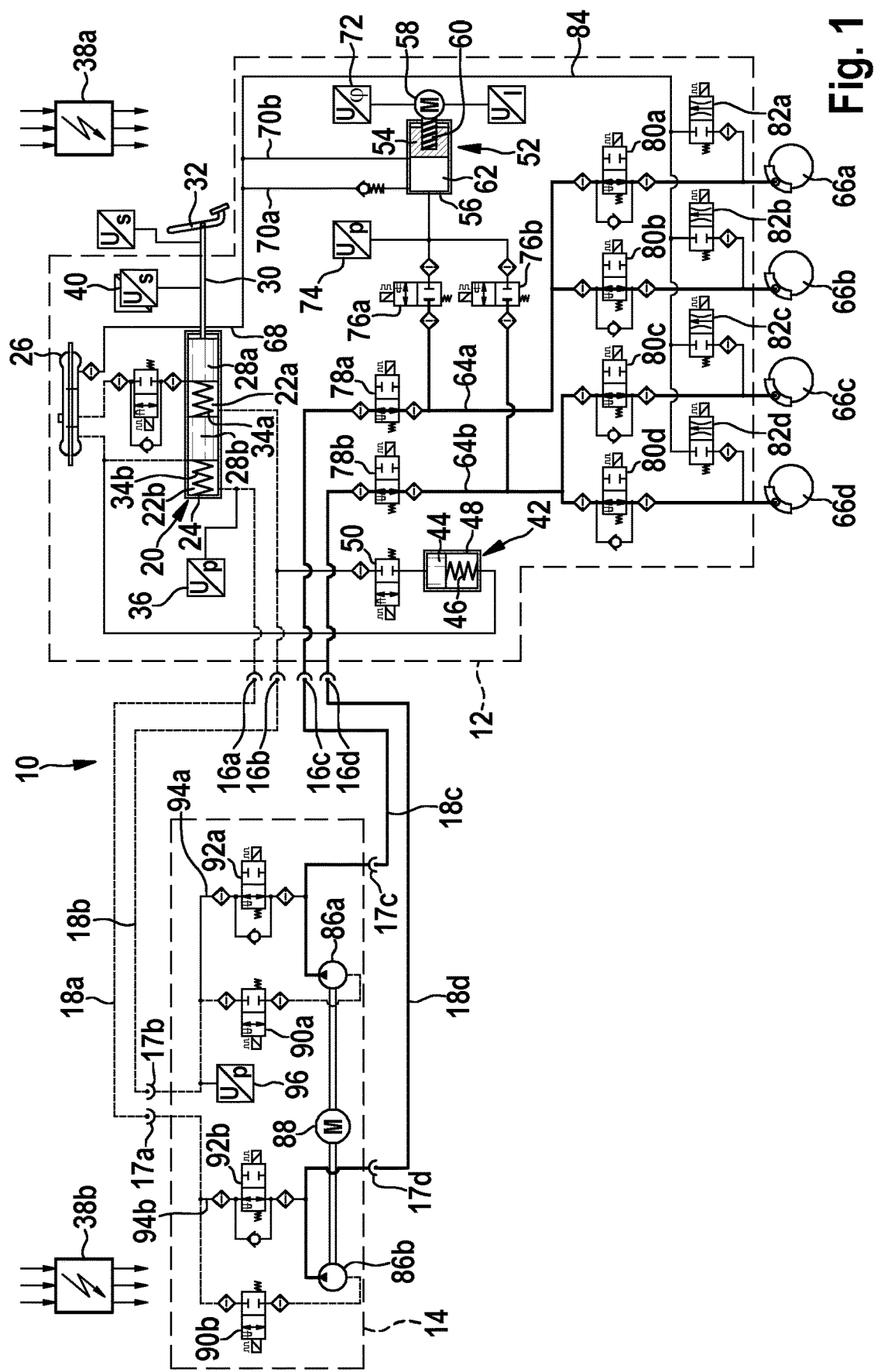
FIG. 1 shows a hydraulic circuit diagram of a power brake system on which the present invention is based. The Figure shows this power brake system in a basic, non-actuated state in which there is no current.

According to the hydraulic circuit diagram of FIG. 1, the electronically slip-controllable power brake system 10 shown there is made up of a primary pressure generator assembly 12 and a secondary pressure generator assembly 14. The two pressure generator assemblies 12, 14 form constructive units that are spatially separate from one another, having hydraulic connections 16a-d, 17a-d, which are separable and can be respectively hydraulically contacted to one another via a total of four hydraulic lines 18a-d.

Primary pressure generator assembly 12 includes, inter alia, a master brake cylinder 20 having two pressure chambers 22a,b in a brake cylinder housing 24. A supply of hydraulic pressure medium to pressure chambers 22a,b takes place via a pressure medium reservoir 26 that is for example integrated in primary pressure generator assembly 12.

Pressure chambers 22a,b are, inter alia, each limited by one of a total of two brake cylinder pistons 28a,b. A first brake cylinder piston 28a is designated rod piston, and is coupled, via an actuating rod 30, to an actuating device, here realized, as an example, in the form of a brake pedal 32. Second brake cylinder piston 28b, in contrast, is configured in floating fashion inside brake cylinder housing 24, and is correspondingly called a floating piston. Via piston springs 34a,b, rod pistons and floating pistons mutually support one another or are supported on a closed end of brake cylinder housing 24.

When there is an actuation of brake pedal 32 by the driver, an axial force acts on the rod piston, which force is forwarded, by piston spring 34a between brake cylinder pistons 28a,b, to the floating piston, and is forwarded by the floating piston via piston spring 38b to brake cylinder housing 24. Consequently, when there is an actuation of brake pedal 32 both brake cylinder pistons 28a,b move together axially into brake cylinder housing 24. As a result of this piston movement, the volume of the two pressure chambers 22a,b becomes smaller, and the pressure of the pressure medium volume enclosed therein consequently increases.

This pressure is measured by a first pressure sensor 36, and is supplied to an electronic control device 38a assigned to primary pressure generator unit 12. As an example, pressure sensor 36 is connected to pressure chamber 22b, limited by the floating piston, of master brake cylinder 20.

A path sensor 40 that is also provided measures the actuation path of actuating rod 30. The corresponding path signal is also forwarded to electronic control device 38a of primary pressure generator assembly 12.

The actuation path of actuating rod 30, and the pressure in pressure chambers 22a,b of master brake cylinder 20, are variables proportional to one another based on the pressure medium volume displaced from pressure chambers 22a,b of master brake cylinder 20 when there is a braking process. They represent a desired braking specified by the driver, and are accordingly the main control variables of power brake system 10. Using the pressure/volume characteristic curves of brake circuits 64a,b of power brake system 10, stored digitally in electronic control device 38a, from the actuation path the displaced volume of pressure medium and, finally, a target brake pressure to be expected in brake circuits 64a,b can be determined. Conversely, from the measured brake pressure a target value can likewise be ascertained for an actuation path of actuating rod 30, so that on the basis of this relation the signals for the brake pressure and the path of the actuating device can be mutually plausibilized by electronic control device 38a.

In order to enable the representation of a path of actuating rod 30, or of at least one brake cylinder piston 28a,b, power brake system 10 is equipped with a pedal path simulator 42. This pedal path simulator 42 is, as an example, connected to pressure chamber 22a enclosed between brake cylinder pistons 28a,b of master brake cylinder 20, and buffers the volume of pressure medium displaced therefrom. For this purpose, pedal path simulator 42 has a simulator piston 44 that is acted on by a simulator spring 46. This spring is supported on the base of a simulator housing 48, and exerts on simulator piston 44 a spring force counter to the inflowing pressure medium. A hydraulic connection of pedal path simulator 42 to the allocated pressure chamber 22a of master brake cylinder 20 is controllable by a simulator control valve 50. This simulator control valve 50 is an electronically controllable switching valve that is normally closed, whose inlet is contacted to pressure chamber 22a of master brake cylinder 20 and whose outlet is contacted to a simulator chamber of pedal path simulator 42.

From the two pressure chambers 22a,b of master brake cylinder 20, two hydraulic lines 18a,b, separate from one another, run to a first pair of hydraulic connections 16a,b of primary pressure generator assembly 12. Through these two hydraulic connections 16a,b, pressure medium can flow from pressure medium reservoir 26 via master brake cylinder 20 in the direction of secondary pressure generator assembly 14.

In addition, primary pressure generator assembly 12 is equipped with a first pressure generator driven by an external force. This is a plunger unit 52 having a plunger piston 54 situated in displaceable fashion in a plunger cylinder 56. Plunger piston 54 is driven via an electronically controllable first motor 58 and a mechanical gearing 60 configured downstream from this motor 58. The gearing converts a rotational movement outputted by motor 58 into a linear movement for plunger piston 54. During this movement of plunger piston 54 into plunger cylinder 56, i.e. a movement in the forward direction or direction of pressure buildup, pressure medium is displaced from a plunger working chamber 62 into for example two brake circuits 64a,b connected thereto. In wheel brakes 66a-d, which are contacted to brake circuits 64a,b, a brake pressure correlated to the driver's desired braking is thereupon built up. In the opposite direction, the volume of plunger working chamber 62 increases, and pressure medium flows, in the case of open plunger control valves 76*a,b*, from brake circuits 64*a,b* into plunger working chamber 62, which causes a reduction of brake pressure in brake circuits 64*a,b*. When plunger control valves 76*a,b* are closed, pressure medium flows from pressure medium reservoir 26 back into plunger working chamber 62.

As stated, electronic control device 38*a* of primary pressure generator assembly 12 ascertains a desired braking from the actuation path of actuation rod 30. For this purpose, electronic control device 38*a* ascertains from this path signal a control signal for motor 58 of plunger unit 52.

This plunger unit 52 is also supplied with pressure medium from pressure medium reservoir 26 via a supply line 68. Supply line 68 is routed directly to pressure medium reservoir 26, and branches into a first line branch 70*a*, which opens into plunger working chamber 62 at the outer point of reversal of plunger piston 54, and a second line branch 70*b* that opens into plunger working chamber 62 in the area of an inner reversal point of plunger piston 54.

For, inter alia, the monitoring and controlling of plunger unit 52, a rotational angle sensor 72 is provided that measures the angle of rotation traveled by the driveshaft of motor 58, and forwards this signal to electronic control device 38*a* for evaluation. The traveled angle of rotation is proportional to the actuation path of plunger piston 54, and accordingly provides a reliable item of information about the volume of pressure medium displaced into brake circuits 64*a,b* by plunger unit 52, or, via known pressure/volume characteristic curves of brake circuits 64*a,b*, about a target brake pressure to be expected in brake circuits 64*a,b*. Via a second pressure sensor 74 contacted with plunger working chamber 62, an actual value for the brake pressure arising in one of the brake circuits 64*a,b* is measurable.

The connections of plunger unit 52 to brake circuits 64*a,b* are each made controllable. For this purpose, each brake circuit 64*a,b* is equipped with a plunger control valve 76*a,b*. These plunger control valves 76*a,b* are electrically controllable by control device 38*a* of primary pressure generator assembly 12, and can be switched over from a normally closed base position into a open position.

In addition, in each brake circuit 64*a,b* there is a respective so-called circular isolation valve 78*a,b*, each situated downstream from the mentioned plunger control valves 76*a,b*. These circular isolation valves 78*a,b* are also electrically controllable by control device 38*a* of primary pressure generator assembly 12. They are realized as normally open valves that can be switched over into a blocking position. In the closed state, circular isolation valves 78*a,b* interrupt an otherwise present pressure medium connection of a brake circuit 64*a,b* to a second pair of hydraulic connections 16*c,d* of primary pressure generator assembly 12. Via these hydraulic connections 16*c,d*, primary pressure generator assembly 12 is contacted to associated hydraulic connections 17*c,d* of secondary pressure generator assembly 14.

Downstream from circular isolating valves 78*a,b*, or from plunger control valves 76*a,b*, and upstream from the connected wheel brakes 66*a-d*, a pressure modulation device is in addition provided in brake circuits 64*a,b*. This pressure modulation device includes, per connected wheel brake 66*a-d*, a respective pressure buildup valve 80*a-d* and pressure reduction valve 82*a-d*. These valves are controllable separately from one another by electronic control device 38*a* of primary pressure generator assembly 12, and permit a wheel-individual adjustment of a brake pressure, for example in order to adapt this brake pressure to the slip conditions currently obtaining at the associated wheel. For this purpose, pressure buildup valves 80*a-d* are normally open, and can be moved into a closed position through electrical controlling. A transition from the open to the closed state in pressure buildup valves 80*a-d* can take place continuously using suitable electrical control signals, permitting a very fine-grained adjustment of the brake pressure. In contrast, pressure reduction valves 82*a-d* are realized as switching valves that are switchable from a normally closed base position to a open position, for example if a brake pressure currently prevailing in one of the wheel brakes 66*a-d* is to be reduced in order to prevent an occurrence of wheel slippage. Pressure reduction valves 82*a-d* are connected via a common return line 84 to supply line 68 of plunger unit 52. Pressure medium flowing out from wheel brakes 66*a-d* thus flows directly back to pressure medium reservoir 26, or to plunger unit 52 of primary pressure generator assembly 12.

Per brake circuit 64*a,b*, secondary pressure generator assembly 14 is equipped with a respective pressure generator, i.e. a total of two pressure generators according to the depicted exemplary embodiment. These pressure generators are preferably piston pumps 86*a,b* that can be actuated together by a second motor 88 and an eccentric (not shown) driven thereby. For this purpose, second motor 88 is electrically controllable by a second electronic control device 38*b* assigned to secondary pressure generator assembly 14.

As explained above, pressure generator assemblies 12, 14 each have a total of four hydraulic connections 16*a-d*; 17*a-d*, respectively hydraulically contacted to one another in pairs by four hydraulic lines 18*a-d*. Two of these hydraulic connections 17*a,b* of secondary pressure generator assembly 14 are each coupled to the intake side of one of the piston pumps 86*a,b* of secondary pressure generator assembly 14. These hydraulic connections 17*a,b* are contacted to those two hydraulic connections 16*a,b* of primary pressure generator assembly 12 that are hydraulically connected to pressure chambers 22*a,b* of master brake cylinder 20. The thus depicted pressure medium connections are controllable by so-called high-pressure switching valves 90*a,b* in secondary pressure generator assembly 14. These high-pressure switching valves 90*a,b* are realized such that they can be switched over, through electrical controlling, from a normal closed position into a open position, this switching over being possible, due to the valve construction, even when there is a large pressure gradient at high-pressure switching valves 90*a,b*.

A second pair of hydraulic connections 17*c,d* of secondary pressure generator assembly 14 is respectively assigned to the pressure side of these piston pumps 86*a,b*. This second pair of hydraulic connections 17*c,d* is contacted to a second pair of hydraulic connections 16*c,d* of primary pressure generator assembly 12, and produces a pressure medium connection between piston pumps 86*a,b* of secondary pressure generator assembly 14 and brake circuits 64*a,b* of primary pressure generator simply 12, or wheel brakes 66*a-d* connected thereto. This pressure medium connection is controllable by circular isolating valves 78*a,b*, which are made electronically controllable, in primary pressure generator assembly 12.

Finally, secondary pressure generator assembly 14 also has so-called switchover valves 92*a,b*. These switchover valves 92*a,b* are also controllable by electronic second control device 38*b* of secondary pressure generator unit 14, are open in the base position, and can be brought continuously into a closed position. Switchover valves 92*a,b* thus act as throttle devices with which a flow cross-section in a bypass 94*a,b* that bypasses piston pumps 86*a,b* of secondary pressure generator assembly 14 can be variably adjusted. Through corresponding electrical controlling, they enable the setting of different brake pressures by secondary pressure generator assembly 14.

In their open position, switchover valves 92*a,b* in addition permit a largely unthrottled connection of master brake cylinder 20 to wheel brakes 66*a-d*, and thus permit a buildup of brake pressure in these wheel brakes 66*a-d* through the muscular force of the driver. Among those skilled in the art, this is referred to as a hydromechanical fallback level. This enables a buildup of brake pressure in wheel brakes 66*a-d* by the driver even when none of the pressure generator assemblies 12, 14 are available, for example when there is a total failure of the power supplies of control devices 38*a,b*.

Finally, secondary pressure generator assembly 14 also has a third pressure sensor 96 that measures the brake pressure in the pressure medium connection of master brake cylinder 20 of primary pressure generator assembly 12 to the intake side of a piston pump 86*a,b* of secondary pressure generator assembly 14.

FIG. 1 shows the explained power brake system 10 in its base or rest position. In this position, brake circuits 64*a,b* are in the pressureless state, plunger unit 52 and piston pumps 86*a,b* are not actuated, and the above-named valves are not electrically controlled and correspondingly assume the initial positions specified by their design.

Specifically, this means that simulator control valve 50 is in the closed position, and thus interrupts the pressure medium connection between pressure chamber 22*a* of master brake cylinder 20 and pedal path simulator 42. In contrast, circular isolating valves 78 are open, and produce a hydraulic connection between brake circuits 64*a,b* and secondary pressure generator assembly 14. Plunger unit 52 is decoupled from brake circuits 64*a,b* via the closed plunger control valves 76*a,b*. Pressure buildup valves 80*a-d* are in the open position, and couple wheel brakes 66*a-d* to brake circuits 64*a,b*, while pressure reduction valves 82*a-d* block the connection of these wheel brakes 66*a-d* to return line 84.

At the sides of secondary pressure generator assembly 14, high-pressure switching valves 90*a,b* are closed and switchover valves 92*a,b* are open. Thus, piston pumps 86*a,b* are separated at their intake side from master brake cylinder 20. The intake side of piston pumps 86*a,b* is connected to the pressure side via bypass 94*a,b*, controlled by switchover valve 92*a,b*.

Under normal braking conditions, the power brake system operates as follows:

When a braking is desired, a driver actuates brake pedal 32 and thus imparts an axial force to brake cylinder piston 28*a* (rod piston). This axial force is transmitted via piston spring 34*a* to brake cylinder piston 28*b* (floating piston), and is supported on brake cylinder housing 24 via piston spring 28*b*. Brake cylinder piston 28*a* moves, against the force of piston spring 34*a*, into brake cylinder housing 24, thus displacing pressure medium out of pressure chamber 22*a* between the two brake cylinder pistons 28*a,b*, and into pedal path simulator 42. The connection of master brake cylinder 20 to pedal path simulator 42 is opened in that simulator control valve 50 is controlled by electronic control device 38*a* and is consequently brought into its open position.

The resulting path of the rod piston, or of actuating rod 30, is acquired by path sensor 40 and is forwarded to electronic control device 38*a* of primary pressure generator assembly 12 as control variable. Control device 38*a* recognizes the desired braking and further processes the received path signal to form a control signal to first motor 58 of plunger unit 52. This motor 58 correspondingly drives plunger piston 54 of the pressure generator, which thereupon displaces a volume of pressure medium correlated to the desired braking out of plunger working chamber 62, via plunger control valves 76*a,b*, which are now switched into the open position, into brake circuits 64*a,b*. As a result, the pressure in brake circuits 64*a,b* increases, and, via open pressure buildup valves 80*a-d*, is applied to the connected wheel brakes 66*a-d*.

Secondary pressure generator assembly 14 is accordingly not required in normal braking processes, and becomes active only when a fault has been determined at primary pressure generator assembly 12. However, because such malfunctions occur extremely rarely, from time to time the functional capacity of secondary pressure generator assembly 14, or of its components, has to be tested in order to ensure a brake pressure buildup in the case of fault of primary pressure generator assembly 12.

Corresponding methods form the basis of the present invention. Using the method described below and described on the basis of FIG. 2, first the functional capacity of switchover valves 92*a,b* of secondary pressure generator assembly 14 is tested.

Figure 2:
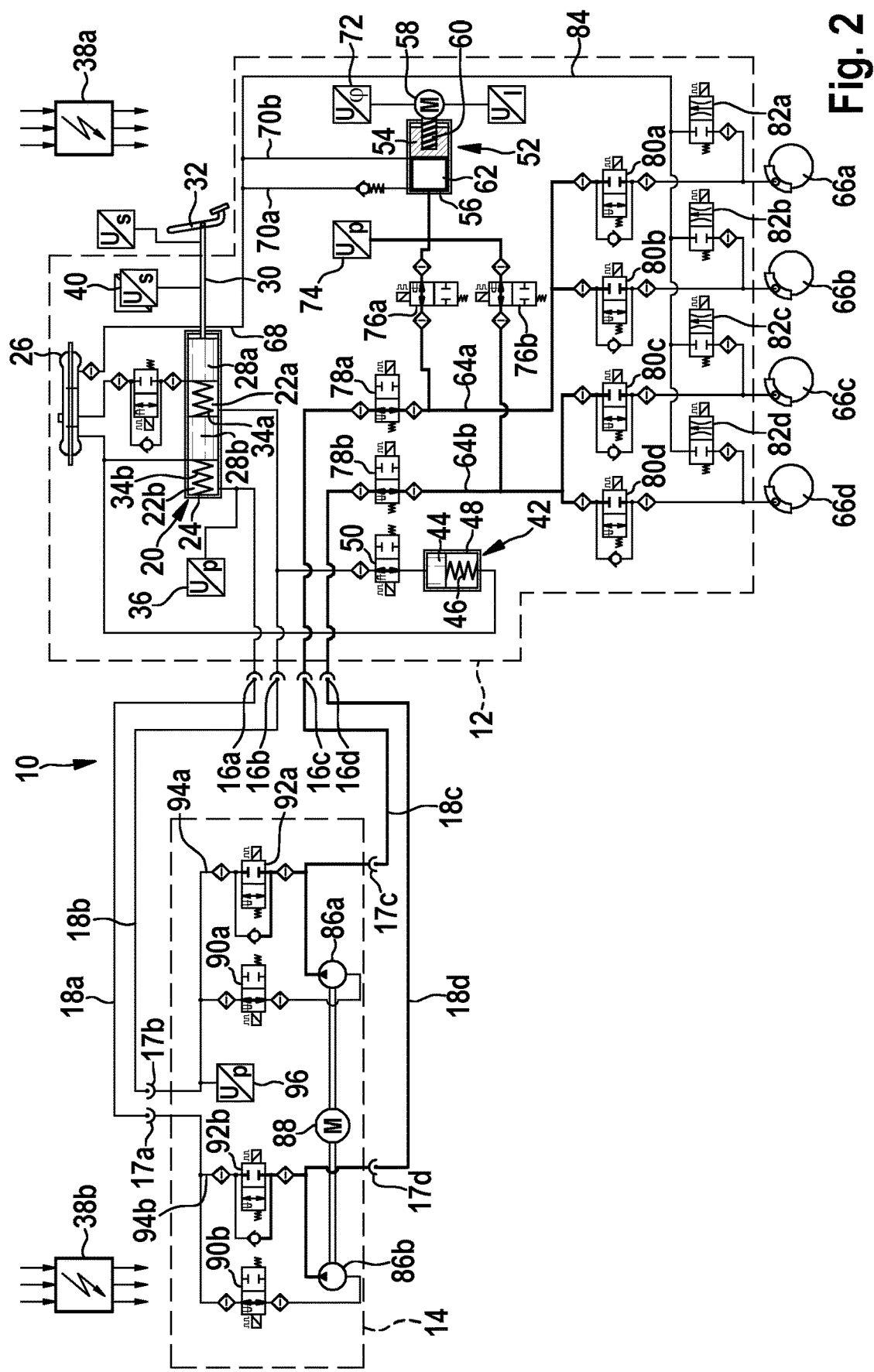
FIG. 2 shows the hydraulic circuit diagram of the power brake system of FIG. 1, in the state of functional testing of a switchover valve of the secondary pressure generator assembly.

As is shown in FIG. 2, for this purpose plunger unit 52 of primary pressure generator assembly 12 is actuated by controlling allocated first motor 58 in the direction of pressure buildup, and plunger control valves 76*a,b* are brought into their open position through electrical controlling. Plunger unit 52 is thus connected to brake circuits 64*a,b*. Through electronic controlling of pressure buildup valves 80*a-d*, these valves are closed and decouple wheel brakes 66*a-d* from brake circuits 64*a,b*. Circular isolating valves 78*a,b* remain open and thus produce a hydraulic connection of secondary pressure generator assembly 14 to brake circuits 64*a,b*. Primary pressure generator assembly 12 and the secondary pressure generator assembly are thus connected, parallel to one another, to brake circuits 64*a,b*.

Inside secondary pressure generator assembly 14, switchover valves 92*a,b* are controlled by second electronic control device 38*b*. Here the control signal is selected such that switchover valves 92*a,b* close only partially and act as throttle devices. From previous investigations or measurements at brake circuit 64*a,b*, it is known which differential pressure obtains at switchover valves 92*a,b* given the specified control signal, or at the set throttle position. This differential pressure is now set through electrical controlling of the drive of plunger unit 52. For the controlling of the control signal at first motor 58, for this purpose the actual value of the brake pressure, measured by second pressure sensor 74, is used.

After the differential pressure has been set, on the basis of the curve of the signal of rotational angle sensor 72 in primary pressure generator assembly 12 it is now assessed whether switchover valves 92*a,b* can hold the set pressure. If for example plunger piston 54 moves in the pressure buildup direction with a speed that exceeds a specified boundary speed, this behavior indicates that the leakage occurring at switchover valves 92*a,b* is impermissibly high. As a consequence, a fault at one of switchover valves 92*a,b* is recognized, and a corresponding warning signal is issued to the driver.

Figure 3:
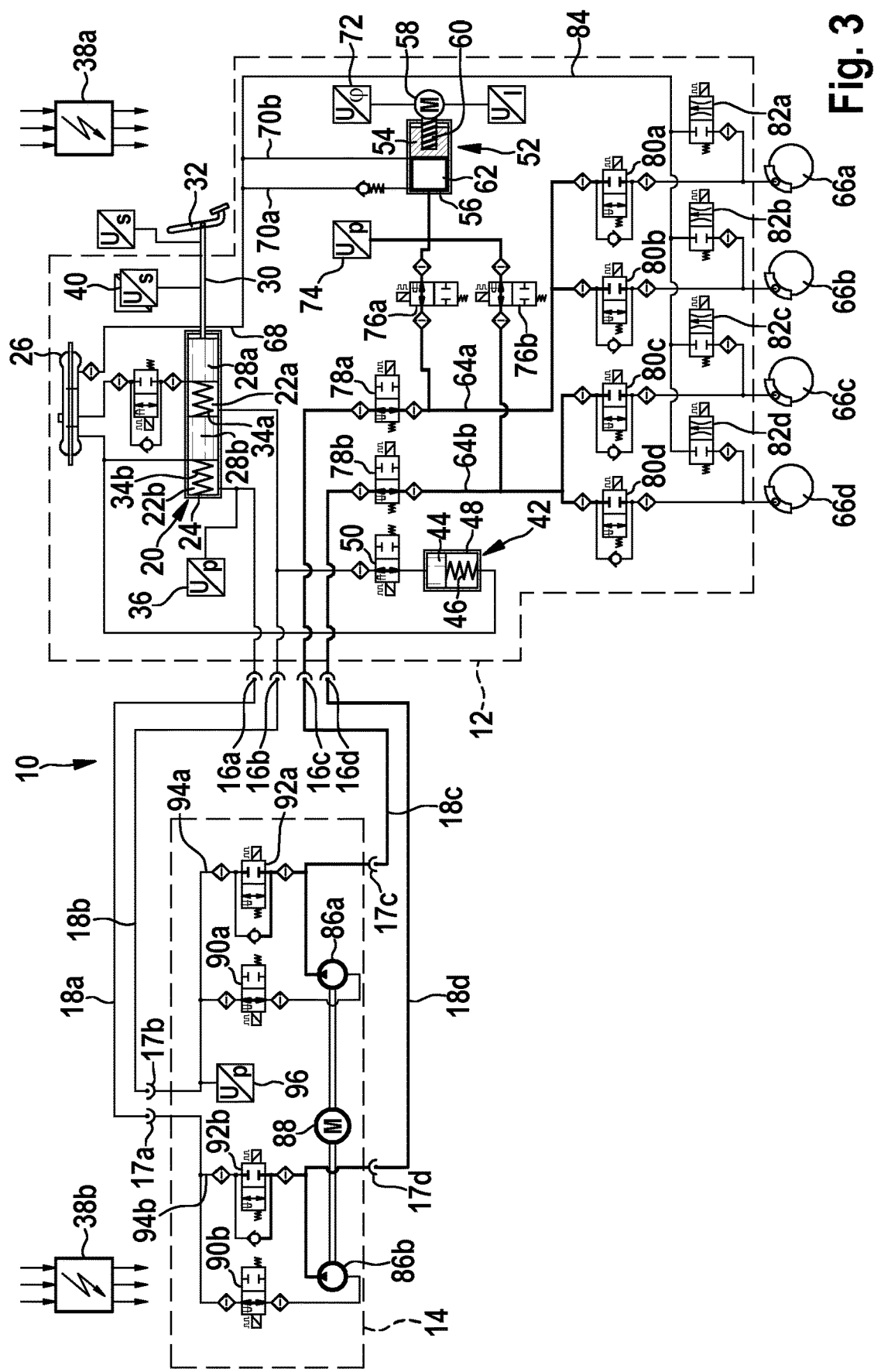
FIG. 3 shows the hydraulic circuit diagram of the power brake system of FIG. 1, in the state of a first variant for testing the functioning of a drive of a pressure generator of the secondary pressure generator assembly.

The functional capacity of second motor 88 of secondary pressure generator assembly 14 can be validated in a similar manner. A first method for this is explained below on the basis of FIG. 3.

In this test method, in primary pressure generator assembly 12 the valves are controlled by the allocated electronic control device 38*a* as follows:

Circular isolating valves 78a,b remain in the base or open position, plunger control valves 76a,b are controlled and assume the open position. Pressure buildup valves 80a-d are also electrically controlled, but as a result assume the closed position.

Second electronic control device 38b, assigned to secondary pressure generator assembly 14, controls switchover valves 92a,b and brings them into the closed position. In addition, electronic control device 38b puts high-pressure switching valves 90a,b into the open position.

As a result, in this method as well piston pumps 86a,b of secondary pressure generator assembly 14 and plunger unit 52 of primary pressure generator assembly 12 are connected in parallel to the two brake circuits 64a,b, and wheel brakes 66a-d are decoupled from these brake circuits 64a,b.

Through controlling of first motor 58 of plunger unit 52, a brake pressure is now built up in brake circuits 64a,b that propagates via open circular isolating valves 78a,b into secondary pressure generator assembly 14, and there propagates up to the pressure side of piston pumps 86a,b.

Second motor 88 of secondary pressure generator assembly 14, which drives piston pumps 86a,b, is now also controlled, and thus has to run against the pressure of primary pressure generator assembly 12. When second motor 88 runs against this pressure, a normal motor state is inferred and no warning signal is issued.

In this context, a recognition of the motor startup takes place through an analysis of the control signal of motor 88 in electronic control device 38b. As control signal, a pulse-width-modulated signal is used. The pulse width, i.e. the distance between the beginning of two voltage peaks, determines the motor rotational speed, and via this the output of the pressure generator, and the output integrated over time yields the total conveyed pressure medium volume, and finally the brake pressure that potentially arises in brake circuits 64a.b. In the blanking interval, i.e. in the region between the end of a voltage peak and the beginning of a following voltage peak, the brake pressure acting on piston pumps 86a,b acts against the rotational movement of motor 88 and brakes this rotational movement. During this, motor 88 induces a voltage signal that can be electronically acquired and evaluated in electronic control device 38b, for example using an ASIC provided separately for this purpose. By comparing the induced voltage to a known voltage signal that is to be expected at a corresponding braking torque, motors 88 having errors are determined and, if appropriate, the driver is warned.

Figure 4:
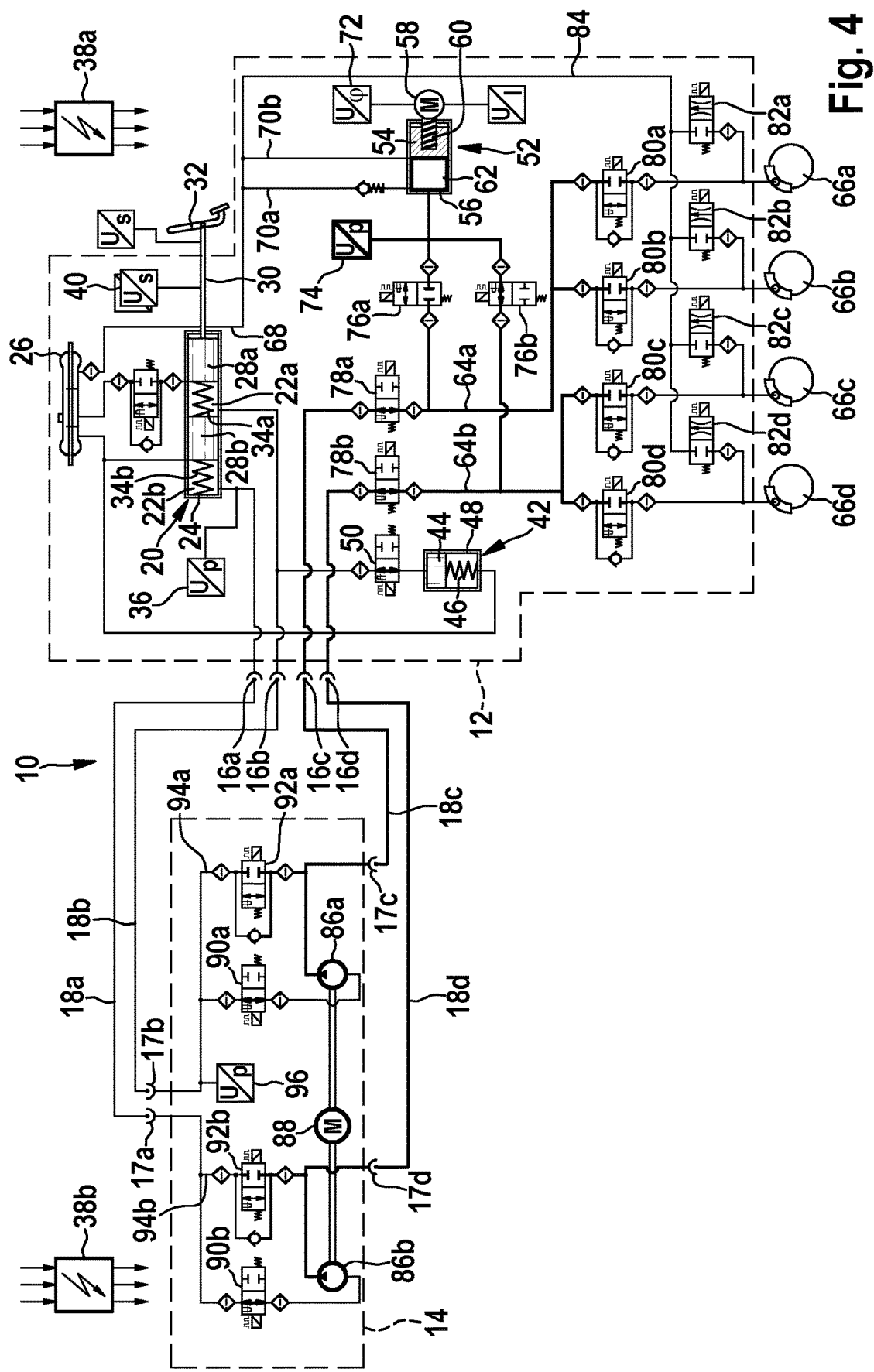
FIG. 4 shows the hydraulic circuit diagram of the power brake system of FIG. 1, in the state of a second variant for testing the functioning of a drive of a pressure generator of the secondary pressure generator assembly.

In an alternative method, shown in FIG. 4, a validation of second motor 88 of secondary pressure generator assembly 14 can take place via second pressure sensor 74 assigned to plunger unit 52 of primary pressure generator assembly 12.

For this purpose, in primary pressure generator assembly 12 circular isolating valves 78a,b at first also remain in their base, or open, position, and pressure buildup valves 80a-d are closed by electronic controlling.

With a controlling of plunger unit 52 of primary pressure generator assembly 12, in brake circuits 64a,b a freely selectable brake pressure can be set, the signal of second pressure sensor 74, assigned to plunger unit 52, being used as controlling variable for the brake pressure controlling.

In addition, in secondary pressure generator assembly 14, high-pressure switching valves 90a,b are switched into the open position, and piston pumps 86a,b are actuated. In addition, switchover valves 92a,b of secondary pressure generator assembly 14 are controlled by electronic control device 38b. Its control signal puts switchover valves 92a,b into a throttle position in which the pressure difference at switchover valves 92a,b is higher than the brake pressure produced by plunger unit 52.

The existing pressure difference brings about a shift of plunger piston 54 of plunger unit 52 of primary pressure generator assembly 12 in the direction of pressure reduction. This backwards movement of plunger piston 54 can be quantitatively acquired using angular rotation sensor 72, assigned to motor 58 of plunger device 52. From the angular rotation signal, the path traveled by plunger piston 54 is ascertained, and, using the known geometrical dimensions of plunger piston 54, an actual value is ascertained for the pressure medium volume conveyed from secondary pressure generator assembly 14 in the direction of primary pressure generator simply 12. This actual value is compared to a target value for the conveyed pressure medium volume. This target value is calculable from the pressure difference set by secondary pressure generator assembly 14, the known geometrical data of piston pumps 86a,b, and the electrical control signal at second motor 88 that drives piston pumps 86a,b. If a difference between the actual value and the target value exceeds a definable boundary value, a faulty drive of piston pumps 86a,b in secondary pressure generator assembly 14 is inferred, and a warning signal is issued.

A high-pressure switching valve 90a,b in secondary pressure generator assembly 14 that is wrongly closed can be recognized in that piston pump 86a,b in brake circuit 64a,b of faulty high-pressure switching valve 90a,b is not able to build up any brake pressure. Through alternating switching over of plunger control valves 76a,b from the open position into the closed position, and electronic evaluation of the signal of rotational angle sensor 72, it is possible to determine the brake circuit 64a,b in which an incorrectly closed high-pressure switching valve 90a,b is located. A fault is present if no hydraulic pressure medium is conveyed by piston pumps 86a,b of secondary pressure generator assembly 14 to plunger unit 52 of primary pressure generator assembly 12 through the brake circuit 64a,b having the open plunger control valve 76a,b. This is manifested as a missing actuation path of plunger piston 54 of plunger unit 52 in the pressure reduction direction, and is detectable through electronic evaluation of the signal curve of rotational angle sensor 72.

If one of the errors explained above has been determined, a warning signal is issued to the driver. This can for example prompt the driver to have power brake system 10 of the vehicle tested at a repair shop, and to have it repaired if needed. The readiness for use of a secondary pressure generator assembly 14, in particular in autonomously driving vehicles, can thus be reliably tested and ensured over the lifespan of the power brake system. Situations in which none of the pressure generator assemblies 12, 14 of the explained power brake system 10 are capable of building up a brake pressure can in this way be reliably avoided.

Of course, modifications or supplementations of the described methods or devices are possible without departing from the basic features of the present invention, in view of the disclosure herein.

What is claimed is:

1. A method for functionally testing a secondary pressure generator assembly in an electronically slip-controllable power brake system having redundant brake pressure generation, the power brake system including: a primary pressure generator assembly to which a first electronic control device is assigned and that includes primary components, the primary components including a first motor controllable by the first electronic control device, and a first pressure generator drivable by the first motor, and the secondary pressure generator assembly to which a second electronic control device is assigned and that includes secondary components, the secondary components including a second motor controllable by the second electronic control device and a second pressure generator drivable by the second motor, the primary pressure generator assembly and the secondary pressure generator assembly being capable of being contacted, parallel to one another and each in controllable fashion, to at least one brake circuit, the power brake system further including at least one wheel brake capable of being loaded by pressure medium being separably connected to the brake circuit, an electronically actuatable first valve device configured to control a contacting of the first pressure generator to the brake circuit, an electronically actuatable second valve device configured to control a contacting of the second pressure generator to the brake circuit, and an electronically actuatable third valve device configured to control a contacting of the wheel brake to the brake circuit, wherein the power brake system is configured to perform a braking by applying to the wheel brake a braking pressure generated by the primary pressure generator assembly, without use of the secondary pressure generator assembly, when the primary pressure generator assembly is in a primary pressure generator assembly faultless state and is configured to perform the braking by applying to the wheel brake a braking pressure generated by the secondary pressure generator assembly when the primary pressure generator assembly is in a primary pressure generator assembly fault state, the method comprising the following steps:

- actuating the first valve device and the second valve device in such a way that the first pressure generator and the second pressure generator are hydraulically contacted, parallel to one another, to the brake circuit, such that the primary pressure generator assembly and the secondary pressure generator assembly are hydraulically connected to each other via at least one hydraulic line of the brake circuit;
- actuating the third valve device in such a way that the wheel brake is decoupled from the brake circuit; and
- while both (a) all of the at least one wheel brake is decoupled from the brake circuit due to the actuating of the third valve device and (b) the primary pressure generator assembly and the secondary pressure generator assembly are hydraulically connected to each other via the at least one hydraulic line of the brake circuit due to the actuating of the first valve device and the second valve device:
  - using the second electronic control device to set the secondary pressure generator assembly into a predefined testing configuration;
  - actuating the first pressure generator, the first motor to generate in the brake circuit a pressure corresponding to a target value of an operation of one of the components of the primary pressure generator assembly or of an operation of one of the components of the secondary pressure generator assembly while the secondary pressure generator assembly is set in the testing configuration;
  - measuring an actual value of the operation of the one of the components of the primary pressure generator assembly or of the operation of the one of the components of the secondary pressure generator assembly;
  - comparing the measured actual value to the target value; and
  - determining whether the secondary pressure generator assembly is in a secondary pressure generator assembly fault state based in a result of the comparison.

2. The method as recited in claim 1, wherein the electronically slip-controllable power brake system is in an autonomously drivable motor vehicle.

3. The method as recited in claim 1, wherein the power brake system is equipped with a simulator device, controllable by an electrically controllable sixth valve device, for a simulation of an actuation path of an actuation device, wherein during the method the sixth valve device is controlled in such a way that the sixth valve device assumes an open position.

4. The method as recited in claim 1, wherein:
- the setting of the secondary pressure assembly into the predefined testing configuration includes controlling a throttle valve in a bypass line that (a) leads from an input into the secondary pressure generator assembly to an output from the second pressure generator assembly into the at least one brake circuit and (b) bypasses the second pressure generator; and
- the actual value that is measured is a speed at which a piston of the first pressure generator moves.

5. The method as recited in claim 1, wherein the power brake system is equipped with a fourth valve device with which a flow cross-section of a pressure medium connection from a pressure side of the second pressure generator to an intake side of the second pressure generator is controllable in a plurality of steps between zero and a maximum value of the flow cross-section, and wherein the fourth valve device is controlled in such a way that the flow cross-section of the pressure medium connection is smaller than a maximum flow cross-section of the pressure medium connection, or that the pressure medium connection is interrupted.

6. The method as recited in claim 5, wherein the power brake system is equipped with a first sensor device that communicates a first sensor signal to the first electronic control device, which signal represents an actuation path and an actuation direction of a piston of the first pressure generator, and with a second sensor device that communicates a second sensor signal to the first electronic control device, which signal represents a pressure generated by the first pressure generator, wherein an electronic controlling of the fourth valve device is carried out in such a way that the flow cross-section of the pressure medium connection is greater than zero and is less than a maximum flow cross-section of the pressure medium connection, and the first pressure generator and the second pressure generator are actuated in such a way that the first pressure generator, taking into account the sensor signal of the second sensor device, generates a pressure that corresponds to a difference pressure occurring at the fourth valve device, and a signal curve of the first sensor device is electronically monitored and evaluated, and a fault of the fourth valve device is determined when an actuation of the piston of the first pressure generator in the direction of pressure buildup takes place, and an actuation speed of the piston exceeds a specified boundary value.

7. The method as recited in claim 5, wherein an electronic controlling of the fourth valve device takes place in such a way that the pressure medium connection is closed, and a selectable pressure is set through an actuation of the first pressure generator, and the second pressure generator is actuated, a control signal of the second motor being electronically monitored and evaluated, and a fault at the second pressure generator is determined when a deviation between an actual value for a voltage value and a target value for a voltage at the second motor of the second pressure generator is greater, at the set pressure, than a specified boundary value.

8. The method as recited in claim 5, wherein through the electrical controlling of the fourth valve device, a flow cross-section of the pressure medium connection is set that is greater than zero and is less than a maximum flow cross-section of the pressure medium connection, and the first pressure generator and the second pressure generator are actuated in such a way that the second pressure generator, in effective connection with the fourth valve device, sets a selectable pressure difference at the fourth valve device that is greater than a pressure controlled by the first pressure generator in effective connection with the first sensor device, and a sensor signal of the first sensor device is electronically acquired and evaluated, and a fault of the second pressure generator of the secondary pressure generator assembly is determined when an actual value, represented by the sensor signal of the first sensor device, for an actuation path of the piston of the first pressure generator in a pressure reduction direction is less than a target value for the actuation path of the piston, the target value being ascertained based on the pressure medium volume conveyed from the second pressure generator to the first pressure generator, taking into account the pressure difference at the fourth valve device, and taking into account a duration of actuation of the second pressure generator.

9. The method as recited in claim 5, wherein the power brake system is equipped with two brake circuits separate from one another, each having a valve unit, assigned to one of the brake circuits, of a first valve device configured to control a contacting of the first pressure generator with one of the brake circuits, having the second pressure generator that includes a plurality of pressure generator units, and each having a valve unit, assigned to one of the pressure generator units of the second pressure generator, of a fifth valve device for controlling a pressure medium connection from an intake side of the assigned pressure generator unit to a master brake cylinder of the power brake system, wherein through electrical controlling of the fourth valve device a flow cross-section of the pressure medium connection is set that is greater than zero and is less than a maximum flow cross-section of this pressure medium connection, and the first pressure generator and the second pressure generator are actuated in such a way that the second pressure generator, in effective connection with the fourth valve device, sets a selectable pressure difference at this fourth valve device that is greater than a pressure controlled by the first pressure generator in effective connection with the first sensor device, and through alternating controlling of the valve units of the first valve devices, one of the valve units of the first valve devices is brought into an open position and the respective other of the valve units of the first valve devices is brought into the closed position, and the signal of the second sensor device is monitored and evaluated, and a fault at one of the valve units of the fifth valve device of the secondary pressure generator assembly is determined when it is ascertained, from the signal of the second sensor device, that an actuation path of the piston of the first pressure generator is smaller than a target value for this actuation path, this target value being ascertained on the basis of the pressure medium volume conveyed from the second pressure generator to the first pressure generator, taking into account a pressure difference at the fourth valve device, and taking into account a duration of actuation of the second pressure generator.

10. The method as recited in claim 1, wherein:
the setting of the secondary pressure assembly into the predefined testing configuration includes:
setting an input side of the of the second pressure generator in hydraulic connection to the at least one hydraulic line at which the pressure corresponding to the target value is generated by the actuating of the first motor; and
controlling the second motor to operate the second pressure generator against a pressure at the input side of the of the second pressure generator; and
the actual value that is measured is of an operating characteristic of the second motor.

11. The method as recited in claim 10, wherein the operating characteristic of the second motor is a rotational speed of the second motor.

12. The method as recited in claim 10, wherein the actual value that is measured is a voltage of the second motor.

\* \* \* \* \*